United States Patent [19]

Kubota et al.

[11] 4,245,733

[45] Jan. 20, 1981

[54] FEEDER

[75] Inventors: Shigeru Kubota, Tokyo; Seiji Kano, Yokohama; Masahiro Kubo, Machida, all of Japan

[73] Assignee: Nitto Kogyo K.K., Tokyo, Japan

[21] Appl. No.: 30,633

[22] Filed: Apr. 16, 1979

[30] Foreign Application Priority Data

Apr. 21, 1978 [JP] Japan .................................. 53-47485

[51] Int. Cl.³ ............................................ B65G 47/24
[52] U.S. Cl. .................................... 198/391; 198/396; 198/443; 198/614
[58] Field of Search ............... 198/391, 392, 396, 443, 198/756, 757, 614

[56] References Cited

U.S. PATENT DOCUMENTS

| 3,007,565 | 11/1961 | Yoshikawa | 198/391 |
| 3,900,107 | 8/1975 | Hoppmann | 198/392 |
| 3,966,040 | 6/1976 | Hazelwood | 198/391 |

Primary Examiner—Joseph E. Valenza
Attorney, Agent, or Firm—Oblon, Fisher, Spivak, McClelland & Maier

[57] ABSTRACT

A vibration or shaking feeder combined with a drum which is rotated at high speed is disclosed. The vibration feeder includes a container having a helical ledge around the inner wall of the container for making articles in the container travel to rise up the helical ledge by vibratory motion of the container. The articles advanced up to the uppermost ledge are transferred to the outer drum rotated at high speed and fed to a next stage for further processing.

5 Claims, 4 Drawing Figures

FEEDER

BACKGROUND OF THE INVENTION

1. Field of the Invention

This invention relates generally to a feeder, and more particularly to a vibration or shaking feeder combined with a drum which is rotated at high speed.

2. Description of the Prior Art

In a conventional vibration feeder, moving speed (moving distance per hour) of articles on a shaking table or container is extremely slow. For example, when ceramic rods (6 mm in length and 2 mm in diameter) used for an electronic part, such as, a small-sized resistor, are fed with the use of the vibration table or container, the maximum feeding pieces of the articles are approximately 600/min. in the longitudinal direction. On the other hand, feeding velocity of caps to be fitted on both ends of each ceramic rod is at least three times higher than that of the ceramic rod when the same vibration table or container is used, because the caps are smaller than the ceramic rods. Accordingly, the feeding velocity of the ceramic rods cannot follow the feeding velocity of the caps, which results in inefficiency of production of the small-sized resistor.

SUMMARY OF THE INVENTION

Therefore, it is an object of the present invention to provide a feeder for electronic parts or the like which can eliminates the above-mentioned disadvantages of the prior art.

It is another object of the present invention to provide a feeder for electronic parts or the like which can perform feeding operations at high speed several times to several tens of times as great as the shaking table of the prior art.

It is still another object of the present invention to provide a feeder for electronic parts or the like which can significantly improve feeding efficiency of such articles.

Briefly, this and other objects of the invention are achieved by a provision of an outer drum rotatable at high speed around a vibration or shaking feeder of the prior art which is relatively low in feeding velocity of articles. A feeder according to the present invention comprises a container having a helical ledge around the inner periphery thereof on which articles in the container are gradually advanced from the lower ledge to the uppermost ledge as the container vibrates or oscillates and an outer drum provided around the container which receives the articles falling from the uppermost ledge of the container and rotates at high speed, thereby feeding the articles in a predetermined direction at speed several times or several tens of times higher than the moving velocity of the articles by the vibration within the container.

According to the present invention, the electric component rods for the small-sized resistor can be fed at a speed of 1,500–2,000 pieces per minute. Furthermore, the feeder according to the present invention is applicable to feed various kinds of articles regardless of its size or shape, such as, for example, powdered or granular medicines, tables, fruit, agricultural products, electric or electronic parts, mechanical parts or the like, at speed several times or several tens of times higher than the feeding speed of the vibration or shaking feeder of the prior art.

BRIEF DESCRIPTION OF THE DRAWINGS

Various other objects, features and attendant advantages of the present invention will be more fully appreciated as the same become better understood by reference to the following detailed description when considered in connection with the accompanying drawings, wherein, like reference numerals designate like or corresponding parts throughout the several views, and in which.

DETAILED DESCRIPTION OF THE PREFERRED EMBODIMENTS

The preferred embodiment of the present invention will be hereinafter described with reference to a feeding apparatus for electronic parts shown in the accompanying drawings.

Figure 1:
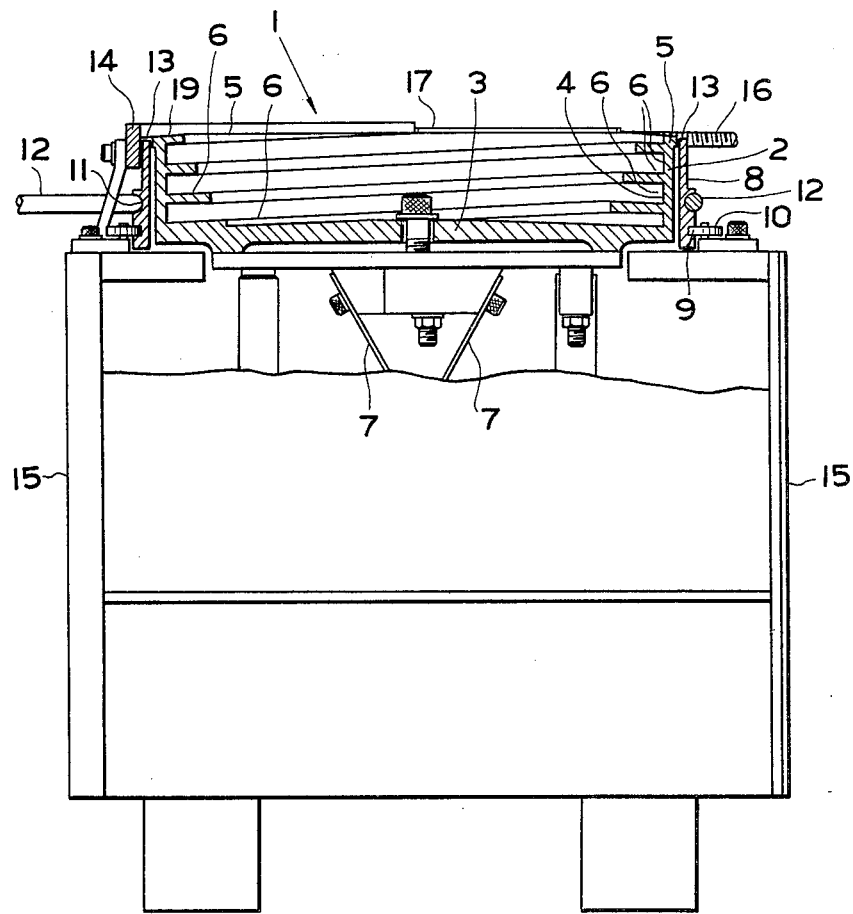
FIG. 1 is a partly cut away elevational view of an apparatus according to an embodiment of the present invention.
Figure 3:
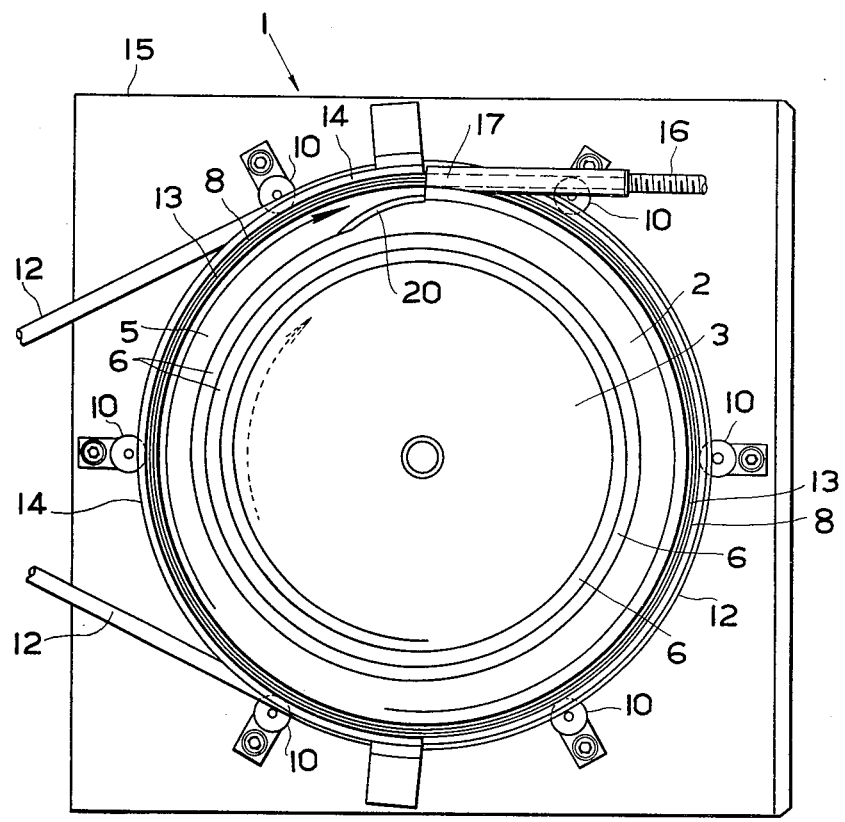
FIG. 3 is a top plane view of an apparatus shown in FIG. 1.

Referring to FIGS. 1 and 3, the feeding apparatus according to the present invention is generally indicated by reference numeral 1. The feeding apparatus 1 includes a container 2 in the shape of open-top tray or basin which is generally used in the conventional vibration or shaking feeder. The container 2 is formed of a domed shaped bottom bulging upwardly at the center thereof and an inner peripheral wall 4 which is provided with a helical ledge 6 continuously ascending from the bottom 3 up to the uppermost ledge 5 at a predetermined angle. The container 2 is supported by, such as, for example, three pieces of intercrossing leaf springs 7 and is subjected to vibrations by means of an appropriate vibrating apparatus (not shown).

Reference numeral 8 designates an outer drum mounted around the outer periphery of the container 2 in such a manner that the drum 8 can be rotatably supported by a plurality of rollers 10 which are engaged with an annular groove 9 provided at the lower outer periphery of the drum 8 as shown in FIG. 3. The outer drum 8 can be rotated by a motor (not shown) through a belt 12 engaging with a groove 11 around the outer periphery of the drum 8. In alternative embodiments, the outer drum 8 may be rotated by a pulley frictionally contacted to the outer periphery of the drum 8 or a gear engaged with teeth around the outer periphery of the drum 8.

Reference numeral 13 designates an annular groove formed on an upper peripheral surface of the outer drum 8. Reference numeral 14 designates a guide cover mounted on a frame 15 so that it may encircle the annular groove 13 from the outside for protecting the articles on the annular groove 13 from falling therefrom when they are in the feeding operation. Reference numeral 16 is a flexible tube connected to a conduit 17 having an opening directed to a tangential direction of the annular groove 13 of the outer drum 8. Reference numeral 20 is a notch formed on the uppermost ledge 5.

In the embodiment of the present invention, the inner diameter of the outer drum 8 is approximately 200 mm and its peripheral speed is set at 12000 mm/min.. However, it should be noted that the container 2 and the outer drum 8 can be formed to have a inner diameter of several meters when feeding larger sized articles, such as, for example, fruits. In this case, the peripheral speed of the drum is significantly increased.

Figure 2:
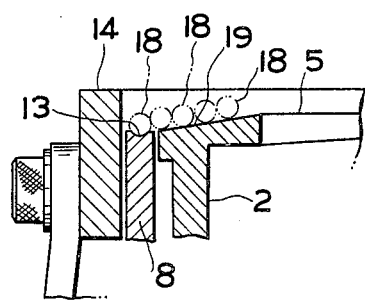
FIG. 2 is a fragmentary enlarged sectional view of an apparatus shown in FIG. 1.
Figure 4:
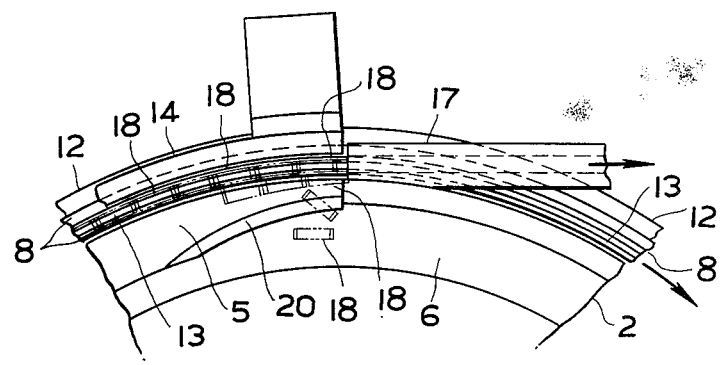
FIG. 4 is a fragmentary enlarged top plane view of an apparatus shown in FIG. 4.

Reference is now made to the operation of the feeding apparatus of the present invention. When supplying the container 2 with a plurality of the articles 18 to be fed, such as, for example, resistive component rods, and making the container 2 vibrate, the articles 18 gradually advance and ascend on the helical ledge 6 up to the uppermost ledge 5. Then, the articles 18 are rolled on a slanted guide surface 19 formed on the uppermost ledge 5 and shifted to the annular groove 13 of the outer drum which is rotating around the uppermost ledge 5 as shown in FIG. 2. Since the outer drum 8 is rotated at high speed, the articles 18 on the annular groove 13 are continuously fed to the flexible tube 16 through the conduit 17. As shown in FIG. 4, the surplus articles 18 which do not enter into the conduit 17 fall on the lower herical ledge 6 or the bottom 3 through the notch 20, and advance and ascend on the helical ledge 6 to repeat the foregoing operation.

As explained hereinabove, the articles 18 are continuously fed to the inside of the conduit 17 at high speed by the outer drum 8 which is rotated at high speed. It should be noted that the helical ledge 6 leading to the uppermost ledge 5 is preferably formed to have sufficient width so that the articles 18 accumulated on the bottom 3 of the container 2 may be advanced on the helical ledge 6 up several rows to the uppermost ledge 5 as shown in FIG. 2. When the articles 18 reach the uppermost ledge 5, they are temporarily stationarily positioned there to await processing. Due to the arrangement of the articles 18 on the ledge 5 in rows, the articles 18 can be instantaneously and continuously shifted by gravity to the outer drum 8 so as to fall without interruption even if the outer drum 8 is rotaated at high speed in feeding the article.

The articles 18 entered into the flexible tube 16 are transferred to a next stage for processing by the initial velocity exerted by the continuous rotation of the outer drum 8 and falling by gravity.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A vibration or shaking feeder comprising:
    a container having an inner peripheral wall forming a helical ledge for transferring a plurality of articles in said container at a first rate of speed up said helical ledge around said inner peripheral wall of said container by vibratory motion of said container;
    means for supporting and vibrating said container;
    a cylindrically-shaped outer drum mounted around an outer peripheral portion of said container for receiving said articles from an uppermost ledge of said helical ledge of said container, said outer drum having an upper peripheral surface and including an annular groove formed in said upper peripheral surface;
    means for rotating said drum at a second rate of speed higher than said first rate of speed; and
    conduit means having an opening positioned along the tangential direction of said annular groove of said outer drum for continuously ejecting said articles from said outer drum in a predetermined direction by centrifugal force resulting from rotation of said outer drum at said second rate of speed.

2. The vibration or shaking feeder set forth in claim 1, wherein said helical ledge is of sufficient width to dispose said articles in several row thereon.

3. The vibration or shaking feeder set forth in claims 1 and 2, said uppermost ledge further comprising a slanted surface portion which slants radially downwards towards said outer drum.

4. The vibration or shaking feeder set forth in claims 1 and 2, said uppermost ledge including a notch formed therein for permitting said articles not entering said conduit to fall onto said container for retransfer to said helical ledge.

5. The vibration or shaking feeder set forth in claim 1, further comprising a stationary guide cover positioned adjacent said annular groove for guiding said articles upon being ejected.

* * * * *